(12) United States Patent
Sakai et al.

(10) Patent No.: US 8,678,342 B2
(45) Date of Patent: Mar. 25, 2014

(54) AIR-OPERATED VALVE

(75) Inventors: Takahiro Sakai, Aichi-ken (JP); Hironori Matsuzawa, Aichi-ken (JP); Shuji Izumo, Aichi-ken (JP); Kimihito Sasao, Aichi-ken (JP)

(73) Assignee: Advance Denki Kougyou Kabushiki Kaisha, Aichi-ken (JP)

( * ) Notice: Subject to any disclaimer, the term of this patent is extended or adjusted under 35 U.S.C. 154(b) by 371 days.

(21) Appl. No.: 13/220,610

(22) Filed: Aug. 29, 2011

(65) Prior Publication Data

US 2012/0119129 A1 May 17, 2012

(30) Foreign Application Priority Data

Nov. 17, 2010 (JP) ................................ 2010-256732

(51) Int. Cl.
*F16K 1/00* (2006.01)

(52) U.S. Cl.
USPC ........................................ 251/63.5; 251/186

(58) Field of Classification Search
USPC .......... 251/62, 63, 63.4, 63.5, 63.6, 186, 190, 251/335.2; 91/534, 535
See application file for complete search history.

(56) References Cited

U.S. PATENT DOCUMENTS

| 3,415,486 | A | * | 12/1968 | De Frees | 251/63.6 |
| 3,420,264 | A | * | 1/1969 | Dolling | 251/62 |
| 3,845,932 | A | * | 11/1974 | Fontaine | 251/63.4 |
| 4,309,022 | A | * | 1/1982 | Reinicke et al. | 251/63.4 |
| 4,460,007 | A | * | 7/1984 | Pirkle | 251/62 |
| 7,322,557 | B2 | * | 1/2008 | Nagao et al. | 251/63.5 |

FOREIGN PATENT DOCUMENTS

| JP | 3590572 B2 | 11/2004 |
| JP | 2005-233298 A | 9/2005 |

* cited by examiner

*Primary Examiner* — Eric Keasel

(74) *Attorney, Agent, or Firm* — Cheng Law Group, PLLC

(57) ABSTRACT

An air-operated valve which can keep the impact at the time a valve part sits on a seat from causing material from shedding and thereby generating particles which contaminate a controlled fluid and thereby can maintain a high cleanliness of the controlled fluid, that is, an air-operated valve which is provided with a valve chamber body which has a valve chamber which forms a seat, a valve mechanism which is provided with a valve part which seals the seat and with a diaphragm in the valve chamber, and a housing body which houses a drive mechanism which uses working air to make the valve mechanism advance and retract to drive and control it to open and close the seat, the drive mechanism provided with a first piston, a first spring which biases the first piston, a second piston which is slidably housed in the housing body and slidably houses the first piston inside it and which pushes the first piston, and a second spring which biases the second piston, the spring force of the second spring being made larger than the spring force of the first spring.

6 Claims, 9 Drawing Sheets

AIR-OPERATED VALVE

BACKGROUND OF THE INVENTION

1. Field of the Invention

The present invention relates to an air-operated valve, more particularly relates to an air-operated valve which suppresses the generation of particles caused when a valve part is seated on a seat.

2. Description of the Related Art

In the production of semiconductors etc., the pure water for washing the silicon wafers and the chemicals and other fluids for etching are required to be extremely high in cleanliness. Specifically, in the road map for next generation semiconductors, which foresees larger scale integration of semiconductors and greater miniaturization of processing, reduction of the line width in circuit patterns to 20 nm or less is being targeted. Therefore, intermixture of particles of 20 nm or larger size in the fluid would have a major impact on the product yield. From this, the members which circulate the fluid while maintaining its cleanliness have great significance.

For example, a conventionally structured air-operated valve is disclosed in FIG. 9 (see Japanese Patent No. 3590572 etc.) This air-operated valve 100 is provided with a valve chamber body 111 which has a valve chamber 120 which forms a controlled fluid inflow part 121 and outflow part 122 and a seat 123 between the inflow part and outflow part and with a valve mechanism 130 which is provided with a valve part 131 which advances toward and retracts from the seat 123 to seal it and a diaphragm 140 which is attached inside the valve chamber 120. A drive mechanism 190 which uses working air which flows out of and into an air port 191 to make the valve mechanism 130 advance and retract to drive and control the opening and closing of the seat 123 is housed inside a housing body 112 on the valve chamber body 111. The drive mechanism 190 is provided with a piston 150 which has a pressure receiving part 156 which is connected to the valve mechanism 130 and which receives working air flowing in from the air port 191 and a spring 180 which biases the piston 150 to the seat 123 side. In the figure, reference numeral 114 is a breathing hole, while 116 is a piston space.

The air-operated valve of FIG. 9 is in a state where the valve part is separated from the seat and the controlled fluid circulates. Here, by lowering the feed pressure of the working air from the air port 191, the pressure which is applied to the pressure receiving part 156 of the piston 150 falls. As a result, the biasing force of the spring overcomes the pressure of the inflowing working air, and the piston 150 descends. In this way, through the valve mechanism 130, the valve part 131 sits on the seat 123.

The force for moving the valve part to the closed state (seated state) is solely provided by the biasing force of the spring. The action of making the valve part rise from the seat in the opening direction (unseated state) is the result of not only the air pressure of the working air which flows in right below the piston, but also the pressure of the controlled fluid which is applied to the valve part and the membrane part of the diaphragm. Therefore, to move the valve part to the closed state, it is necessary to select a spring with a spring force which is larger than the force which the controlled fluid applies to the valve mechanism.

For this reason, the higher the pressure of the controlled fluid, the larger the spring force of the spring that must be used. However, the biasing force of the spring with the large spring force is used to make the valve part sit on the seat, so the impact when the valve part sits on the seat is liable to cause shedding of material from the valve part or the seat.

Therefore, a structure which eases the impact when the valve part is seated has been proposed (see Japanese Patent Publication (A) No. 2005-233298). According to the air-operated valve of Japanese Patent Publication (A) No. 2005-233298, a rubber cushion or other buffer member is interposed below the piston which is connected to the valve part. When the feed pressure of the working air which is fed from the air port changes and the piston descends, the above-mentioned buffer member is sandwiched between the piston and body block below it and is pressed and deformed. Therefore, the impact when the valve part sits on the seat is temporarily eased. After that, along with the descent of the piston, the buffer member further deforms and finally the valve part finishes being seated.

Japanese Patent Publication (A) No. 2005-233298 exhibits a certain effect in suppression of particles generated from the operating valve itself. However, as explained above, there is accompanying deformation of the buffer member which is interposed below the piston. Further, along with use of the buffer member, the buffer member probably will suffer from permanent set. Therefore, the reproducibility of the effect of the buffer member at the time of operation can easily become degraded. In addition, even with the structure of Japanese Patent Publication (A) No. 2005-233298, it is necessary to use a spring with a large spring force commensurate with the pressure of the controlled fluid. Further, it is also necessary to add the amount of force decreased by the buffer member, so use of a spring with a larger spring force is necessary. Further, this means the biasing force of a spring with a larger spring force is used to make the valve part sit on the seat. Due to this, the possibility of material being shed due to the impact when the valve part sits on the seat remains.

As related art, there are the above-mentioned Japanese Patent No. 3590572 and Japanese Patent Publication (A) No. 2005-233298

SUMMARY OF THE INVENTION

The present invention was made in consideration of the above-mentioned point and has as its object the provision of an air-operated valve which can keep the impact at the time a valve part sits on a seat from causing material of the valve part or seat from shedding and accompanying particles from contaminating a controlled fluid and thereby can maintain a high cleanliness of the controlled fluid.

That is, the aspect of the invention of claim 1 relates to an air-operated valve which is provided with a valve chamber body which has a valve chamber which forms an inflow part of a controlled fluid, an outflow part of the controlled fluid, and a seat between the inflow part and the outflow part, a valve mechanism which is provided with a valve part which has a seal which advances to and retracts from the seat to seal the same and with a diaphragm which is formed at an opposite side from the seal side and which is attached inside the valve chamber, and a housing body which houses a drive mechanism which uses working air which flows in and out from an air port so as to make the valve mechanism advance and retract to thereby drive and control an opening and closing operation of the seat, the drive mechanism provided with a first piston which is connected to the valve mechanism and which has a first pressure receiving part which receives the working air which flows in from the air port, a first spring which biases the first piston to the seat side, a second piston which is slidably housed in the housing body, which slidably houses the first piston inside of it, and which has a second pressure receiving part which receives the working air which flows in from the air port, and a second spring which biases the second piston to the first piston side, the second spring has a spring force larger than a spring force of the first spring, when the working air from the air port falls in feed pressure, the load of the first spring counters a rising force of working air which occurs in the first pressure receiving part whereby the first piston descends before the second piston, and, after that, the second piston descends delayed from the first piston whereby the second piston biases the first piston in the seat direction to thereby increase a seal strength between the valve part and the seat in the seated state.

The aspect of the invention of claim 2 relates to an air-operated valve as described in claim 1 wherein the first piston and the second piston have a buffer member interposed between them.

The aspect of the invention of claim 3 relates to an air-operated valve as described in claim 1 wherein the seal of the valve part which sits on the seat is flat in shape.

The aspect of the invention of claim 4 relates to an air-operated valve as described in claim 1 wherein the valve part has a pressure receiving part which receives a fluid pressure of the controlled fluid in an advancing direction of the valve mechanism.

The aspect of the invention of claim 5 relates to an air-operated valve as described in claim 1 wherein a diametrical distance (SD) of the seat which the seal of the valve part sits on the seal is formed to be larger than or the same in size as a diametrical distance (MD) of the diaphragm dividing a movable membrane maximum diameter and a movable membrane minimum diameter in two.

The aspect of the invention of claim 6 relates to an air-operated valve as described in claim 1 wherein a piston space between the air port and the housing body is provided with a venturi of the working air.

According to the air-operated valve according to the aspect of the invention of claim 1, there is provided an air-operated valve which is provided with a valve chamber body which has a valve chamber which forms an inflow part of a controlled fluid, an outflow part of the controlled fluid, and a seat between the inflow part and the outflow part, a valve mechanism which is provided with a valve part which has a seal which advances to and retracts from the seat to seal the same and with a diaphragm which is formed at an opposite side from the seal side and which is attached inside the valve chamber, and a housing body which houses a drive mechanism which uses working air which flows in and out from an air port so as to make the valve mechanism advance and retract to thereby drive and control an opening and closing operation of the seat, the drive mechanism provided with a first piston which is connected to the valve mechanism and which has a first pressure receiving part which receives the working air which flows in from the air port, a first spring which biases the first piston to the seat side, a second piston which is slidably housed in the housing body, which slidably houses the first piston inside of it, and which has a second pressure receiving part which receives the working air which flows in from the air port, and a second spring which biases the second piston to the first piston side, the second spring has a spring force larger than a spring force of the first spring, when the working air from the air port falls in feed pressure, the load of the first spring counters a rising force of working air which occurs in the first pressure receiving part whereby the first piston descends before the second piston, and, after that, the second piston descends delayed from the first piston whereby the second piston biases the first piston in the seat direction to thereby increase a seal strength between the valve part and the seat in the seated state, so it is possible to keep particles generated by the impact when the valve part sits on the seat causing material of the valve part or seat to shed and contaminate the controlled fluid and possible to maintain a high cleanliness of the controlled fluid. Further, a seal force of the seat is also given by the valve part, so there is no effect on the prevention of circulation of the controlled fluid.

According to the air-operated valve according to the aspect of the invention of claim 2, there is provided the aspect of the invention of claim 1 wherein the first piston and the second piston have a buffer member interposed between them so the impact when the first piston and the second piston contact is eased. At the same time, at the time of descent of the second piston, the impact which is applied to the valve part of the valve mechanism which is connected to the first piston is also eased.

According to the air-operated valve according to the aspect of the invention of claim 3, there is provided the aspect of the invention of claim 1 wherein the seal of the valve part which sits on the seat is flat in shape, so all parts of the flat surface of the seal can sit on the seat and the sealability of the seat is ensured.

According to the air-operated valve according to the aspect of the invention of claim 4, there is provided the aspect of the invention of claim 1 wherein the valve part has a pressure receiving part which receives a fluid pressure of the controlled fluid in an advancing direction of the valve mechanism, so a downward force is generated opposite to the upward force which is generated in the valve mechanism. Therefore, through the fluid pressure of the controlled fluid, it becomes easier to make the valve mechanism act downward.

According to the air-operated valve according to the aspect of the invention of claim 5, there is provided the aspect of the invention of claim 1 wherein a diametrical distance (SD) of the seat which the seal of the valve part sits on the seal is formed to be larger than or the same in size as a diametrical distance (ND) of the diaphragm dividing a movable membrane maximum diameter and a movable membrane minimum diameter in two, so the force which the diaphragm side receives in the upward direction due to the fluid pressure of the controlled fluid can be made smaller than the force which the valve part side receives in the downward direction. For this reason, the force received by the valve mechanism due to the fluid pressure of the controlled fluid becomes smaller and, when making the valve element sit on the seat, the first spring with the smaller spring force can be used.

According to the air-operated valve according to the aspect of the invention of claim 6, there is provided the aspect of the invention of claim 1 wherein a piston space between the air port and the housing body is provided with a venturi of the working air, so it is possible to reduce the amount of inflow and amount of outflow of the working air and possible to suppress sudden operations of the drive mechanism accompanying changes in the amount of working air.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
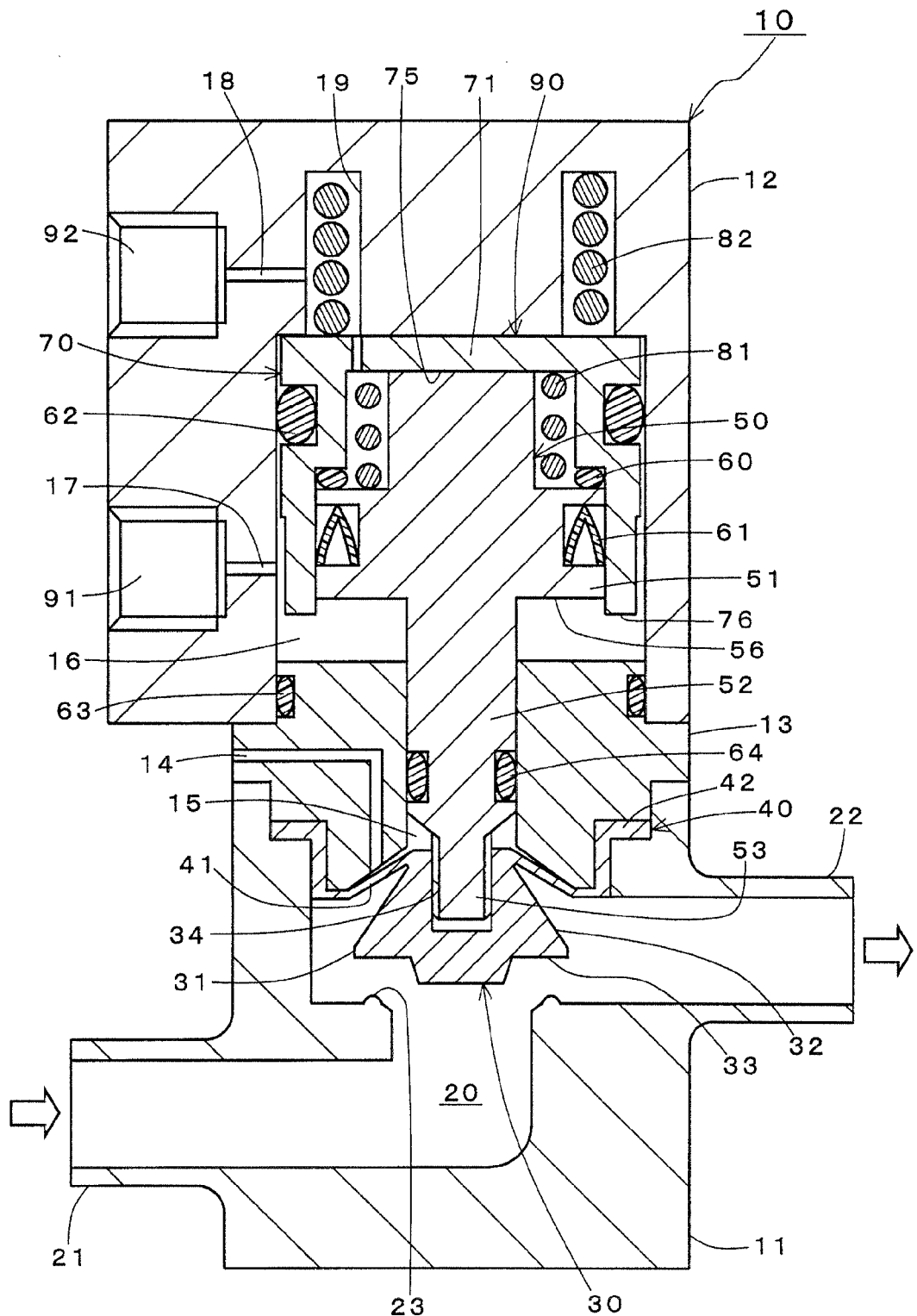
FIG. 1 is a first longitudinal cross-sectional view of an air-operated valve according to an embodiment of the present invention.

The air-operated valve 10 illustrated in the figures as the present invention is mainly installed in fluid pipelines in semiconductor production plants, semiconductor production apparatuses, etc. The air-operated valve 10 is an operating valve which controls the flow of pure water or a chemical or other controlled fluid which flows through a fluid pipeline and stops or resumes the circulation of the controlled fluid in accordance with the feed control of the working air. Note that the disclosed air-operated valve 10, as illustrated, is installed to circulate the controlled fluid from the left side of the paper (reference numeral 21) to the right side (reference numeral 22). As opposed to this, it may also be installed to circulate the controlled fluid from the right side of the paper to the left side (not shown). The method of connection of the air-operated valve 10 can be suitably changed by the design of the pipeline at the location of installation.

First, the overall cross-sectional view of FIG. 1 will be used to explain the structure of the air-operated valve 10 prescribed in the aspect of the invention of claim 1. The air-operated valve 10 of this embodiment is provided with a valve chamber body 11 which circulates the controlled fluid, a valve mechanism 30 which enables the circulation of the controlled fluid to be stopped, a drive mechanism 90 which makes the valve mechanism 30 perform the advancing or retracting operation, and a housing body 12 which houses the drive mechanism 90.

That air-operated valve 10 is exposed to not only ultra pure water, but also hydrofluoric acid, hydrogen peroxide, and other controlled fluids. For this reason, the above-mentioned valve chamber body 11, valve mechanism 30, drive mechanism 90, and housing body 12 or at least the valve chamber body 11 and the valve mechanism 30 are formed from PTFE or another fluororesin with a high corrosion resistance and chemical resistance. The air-operated valve of the embodiment is formed by machining a fluororesin block.

The valve chamber body 11 is provided with an inflow part 21 of the controlled fluid and its outflow part 22. Between the inflow part 21 and the outflow part 22 of the valve chamber body 11, a valve chamber 20 forming a seat 23 is arranged.

The valve mechanism 30 is provided with a valve part 31 (valve element) and a diaphragm 40. The valve part 31 in this embodiment is a frustoconical (frustum of circular cone) shape. At its bottom, a seal 33 is formed which advances and retracts to seal the seat 23. Further, as defined by the aspect of the invention of claim 4, the valve part 31 is provided with a pressure receiving part 32 which receives the fluid pressure of the controlled fluid in the advancing direction of the valve mechanism 30 (see arrow X-direction of FIG. 6). As explained later in detail, by provision of the pressure receiving part 32, a downward force is generated opposite to the upward force generated at the valve mechanism 30 (movable membrane 41 of the diaphragm 40). For this reason, using the fluid pressure of the controlled fluid, the valve mechanism 30 can be easily made to act in the downward direction. At the center of the valve part 31, a connection hole 34 which connects to a connection shaft 53 of a first piston 50 explained later is provided.

The diaphragm 40 has a thin movable membrane 41 forming the diaphragm surface and an outer circumference 42 which is arranged at the outer circumference of the movable membrane 41. The valve mechanism 30 of the embodiment is comprised of the valve part 31 and the diaphragm 40 formed integrally. Of course, it is also possible to form the two separately and then connect them. The outer circumference 42 is fastened by being gripped between the valve chamber body 11 and an intermediate body 13 which is arranged directly above the valve chamber body. A housing body 12 is laid on top of the intermediate body 13. The housing body 12 has a piston space 16 inside of it and enables the outflow and inflow of working air by an air port. In the embodiment, the outside of the air-operated valve 10 and the piston space 16 are connected by a first air port 91 and a second air port 92 of the working air.

The drive mechanism 90 which controls the feed pressure of the working air which flows in from an air port (first air port 91) so as to make the valve mechanism 30 retract or advance to drive and control the opening and closing of the seat 23 is housed in the piston space 16 of the housing body 12 in an advanceable or retractable manner. Between the first air port 91 and the piston space 16 in the housing body 12, a small sized passage 17 is formed. This small sized passage 17, as prescribed in the aspect of the invention of claim 6, becomes the venturi of the working air. By providing the small sized passage 17 (venturi), it is possible to reduce the amount of inflow and the amount of outflow of the working air. Therefore, it is possible to suppress sudden operation of the drive mechanism 90 accompanying change of the amount of working air. The second air port 92 is communicated with a second spring holder 19 which is formed on the top of the piston space 16 through an air passage 18. It becomes an escape path of the air at the top of the piston space.

Figure 5:
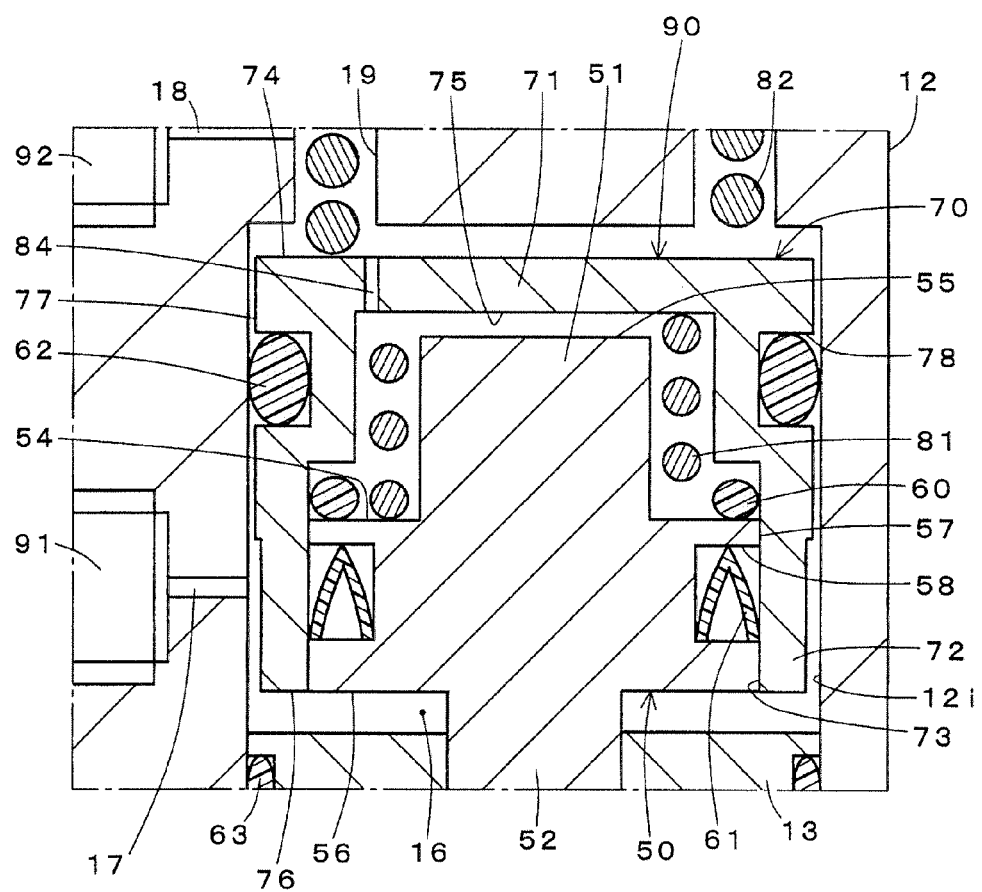
FIG. 5 is an enlarged cross-sectional view of main parts of a first piston and second piston.

The structure of the drive mechanism 90 will be explained using FIG. 1 plus the partial enlarged cross-sectional view of FIG. 5. That drive mechanism 90 is a double piston structure provided with the first piston 50 and a first spring 81 which biases that first piston and with a second piston 70 which houses the first piston slidably inside of it and a second spring 82 which biases that second piston.

The first piston 50 has a first piston head 51 and a piston shaft 52 and is provided with the connection shaft 53 at the front end of the piston shaft 52. The connection shaft 53 is fastened by insertion into the connection hole 34 of the valve mechanism 30. The connection shaft 53 and the connection hole 34 of this embodiment are connected by screwing. The first piston head 51 of the first piston 50 is provided with a first spring mount 54. The first spring 81 which biases that first piston 50 to the seat 23 side is set at the first spring mount 54.

The top of the first piston head 51 forms a piston abutting part 55 and is a location which abuts against the later explained second piston 70. The circumference of the first piston head 51 forms a first piston side surface 57 and can slidably contact the second piston 70 (later mentioned piston inside walls 73). At the circumference of the first piston side surface 57, a first piston groove 58 is formed. In the first piston groove 58, a packing 61 is provided. The shape of the packing 61 is selected considering the direction of the advancing and retracting operation of the first piston 50 (raising and lowering operation). In this embodiment, it is a cross-sectional inverted V-shape packing (V-ring). The bottom of the first piston head 51 is a first piston pressure receiving part 56 and receives feed pressure of the working air which is fed from the first air port 91 to the inside of the piston space 16 of the housing body 12. The area of the first piston pressure receiving part 56 is the pressure receiving area of the working air in that first piston.

The second piston 70 of the embodiment is formed as an inverted cup-shape. The top part of the second piston 70 is a second piston head 71. The circumference of the second piston forms a piston side 72. The second piston 70 is housed slidably inside of the housing body 12, that is, at an inside walls 12i of the piston space 16. At the top of the second piston head 71, a second spring mount 74 is provided. The second spring 82 which biases that second piston 70 to the seat 23 side is set at the second spring mount 74. The second spring 82 is inserted in the spring holder 19 which is formed at the top of the housing body 12, so the attachment position of the second spring is stable.

The bottom of the second piston head 71 is a piston abutting part 15 and becomes the location pushing the above-mentioned first piston 50 downward. The first piston side surface 57 of the first piston member 50 contacts the piston inside walls 73 at the inside of the piston side 72. A second piston groove 78 is formed at a piston outer wall 77 forming the outside of the piston side 72, while an O-ring or other packing 62 is provided at the second piston groove 78.

The bottom end of the piston side 72 is a second piston pressure receiving part 76 and receives the feed pressure of the working air which is fed from the first air port 91 to the inside of the piston space 16 of the housing body 12. The area of the second piston pressure receiving part 76 is the pressure receiving area of the working air in that second piston. An air hole 84 formed in the second piston head 71 forms an escape path of the air of the space which is surrounded by the second piston head 71 and the first piston head 51 in the second piston 70.

The second air port 92 is connected through the second spring holder 19 and the air passage 18 to the top of the piston space 16. It is possible to adjust the amount of inflow and amount of outflow of the air above the second piston 70 in the piston space 16 through the second air port 92. For this reason, it is possible to effectively ease a sudden operation of the drive mechanism 90 which accompanies the feed pressure of the working air which flows in from the first air port 91.

In the illustrated embodiment, as defined in the aspect of the invention of claim 2, a buffer member 60 which has cushionability is arranged at the spring mount 54. The buffer member 60 is an O-ring etc. which is formed from urethane rubber, NBR, HNBR, silicone rubber, fluororesin rubber, or another durable material. The buffer member 60 is provided for easing the impact when the first piston 50 and the second piston 70 contact each other. Furthermore, the buffer member 60 has the role of easing the impact which is applied to the valve part 31 of the valve mechanism 30 which is connected to the first piston 50 when the second piston 70 descends. The illustrated packings 61, 62, 63, and 64 are also comprised of a material similar to the buffer member 60.

Figure 6:
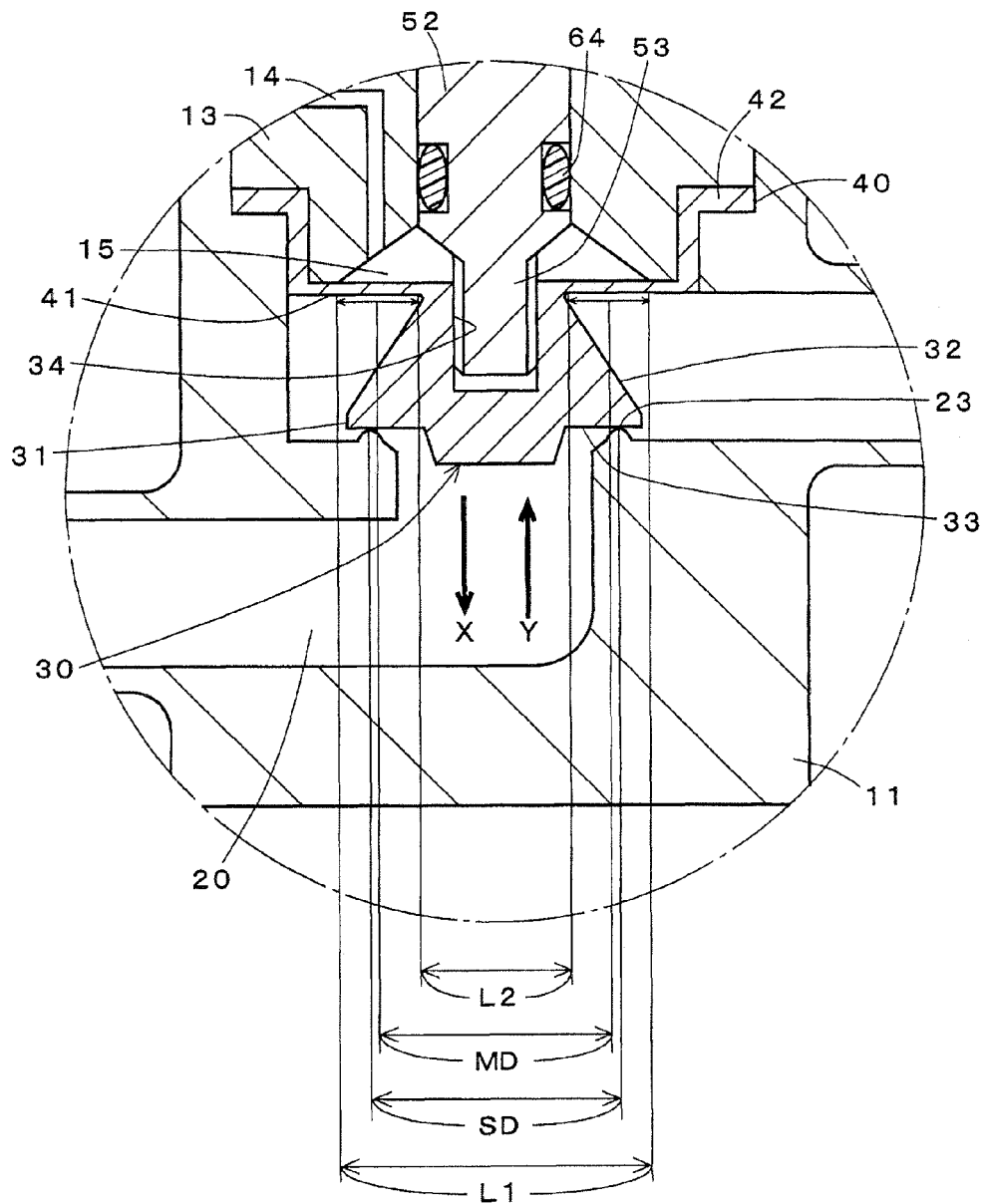
FIG. 6 is an enlarged cross-sectional view of a valve part and seat.

FIG. 6 is an enlarged cross-sectional view showing the structure of principal parts of the valve part 31 and the seat 23. As shown in the figure, as defined by the aspect of the invention of claim 3, the seal 33 of the valve part 31 which sits on the seat 23 is formed flat in shape. For example, in the case of a poppet valve or other valve part disclosed in the air-operated valve of the prior art, the seal of the valve part is often formed at a slant (see FIG. 9). In this case, friction, though slight, easily occurs at the seal surface along with advance and retraction of the valve mechanism.

As opposed to this, as illustrated, since the seal 33 of the valve part 31 which sits on the seat 23 is flat in shape, all parts of the flat surface of the seal 33 can sit on the seat 23. Further, as explained later, the seal 33 of the valve part 31 can closely contact the seat 23 due to the downward pressing force received from the first piston 50 and the second piston 70. For this reason, the sealability of the seat is secured and simultaneously the generation of particles can be better suppressed.

Furthermore, as shown in FIG. 6, in the air-operated valve 10, as prescribed in the aspect of the invention of claim 5, a diametrical distance SD of the seat 23 by which the seal 33 of the valve part 31 sits on the seat 23 for sealing is formed to be larger than a diametrical distance MD of the movable membrane 41 of the diaphragm 40 at a position dividing the movable membrane maximum diameter L1 and the movable membrane minimum diameter L2 into two. Further, the case where the diametrical distance SD and the diametrical distance MD are substantially the same size is also included.

The bottom surface side of that diaphragm 40 faces the valve Chamber 20. The diaphragm 40 is fastened to the valve chamber body 11 by the intermediate body 13. In particular, in the diaphragm 40 of the illustrated embodiment, the part of the membrane which can actually move due to the effect of fastening by the intermediate body 13 becomes somewhat smaller. For this reason, in the movable membrane 41, the movable membrane maximum diameter L1 becomes the diameter of the part which can actually move without including the part which contacts the intermediate body 13. Further, the valve part 31 is formed at the center of the diaphragm 40, so the part of the valve part 31 is excluded from the movable membrane part of the movable membrane 41 to define the movable membrane minimum diameter L2.

Figure 9:
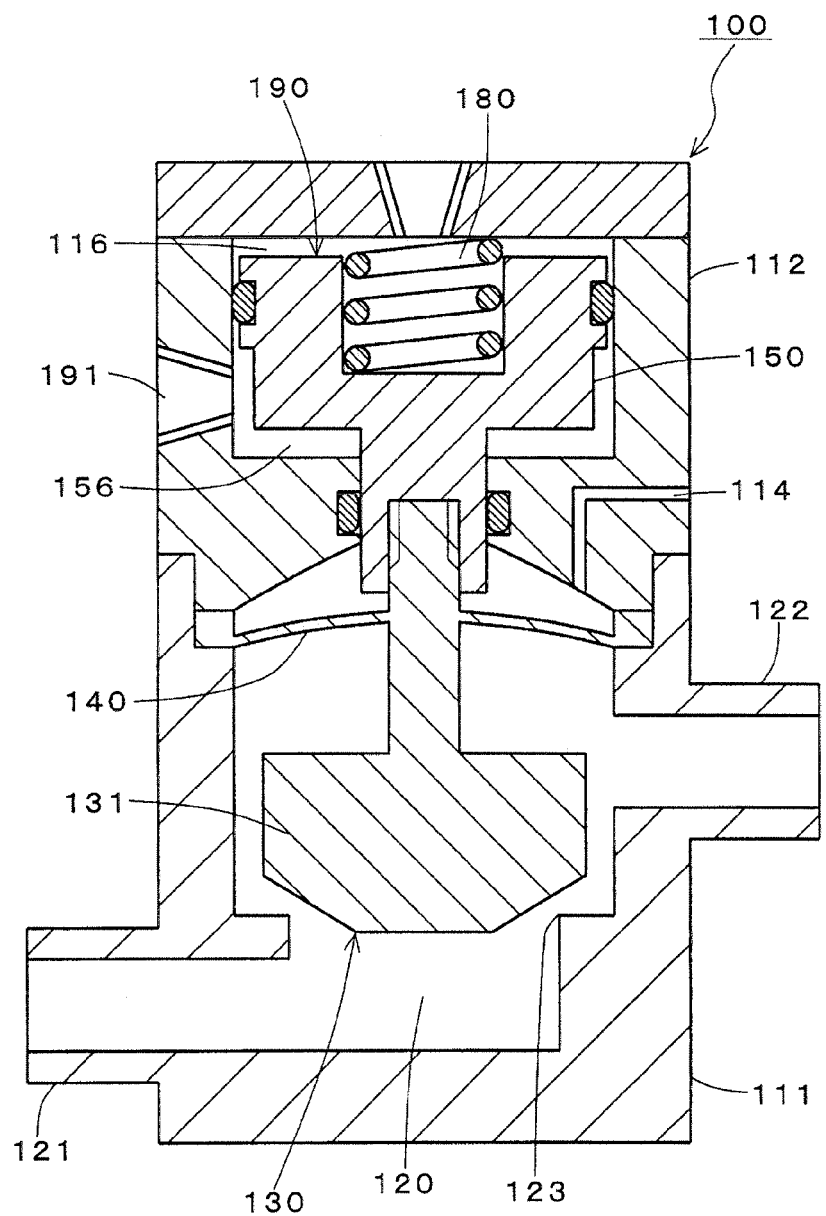
FIG. 9 is a longitudinal cross-sectional view of a conventional air-operated valve.

In general, in the operating valve of a structure of the illustrated embodiment or the prior art of FIG. 9, the fluid pressure of the controlled fluid is applied from both of the inflow part 21 side (primary side) and outflow part 22 side (secondary side) to the diaphragm 40, valve part 31, etc. In the operating valve of that structure, the movable membrane 41 of the diaphragm 40 only naturally bends upon receiving the fluid pressure. At this time, when the movable membrane 41 of the diaphragm receives pressure, pressure is applied vertical to the curved surface of the movable membrane 41. Therefore, the force which acts on the movable membrane 41 is dispersed and becomes smaller. In this way, when a force acts on the movable membrane 41 of the curved diaphragm 40, by experience, the diametrical distance MD at a position of the diaphragm dividing the maximum diameter L1 of the movable membrane and the minimum diameter L2 of the movable membrane in two can be considered as the so-called effective pressure receiving diameter of the movable member 41 of the diaphragm 40 (see Japanese Patent No. 3590572 etc.). Further, at the valve part 31, when receiving fluid pressure from the outflow part 22 side (secondary side), the pressure applied to the outside from the part of that valve part 31 where the seal 33 and the seat 23 abut (outer circumferential edge of the seal 33) is cancelled out. For this reason, the diametrical distance MD and the diametrical distance SD of the seal 23 which is sealed along with the seating of the seal 33 of the valve part 31 can be considered as the diameter of the valve part. Therefore, the diametrical distance MD and the diametrical distance SD of the seal 23 which is sealed along with the seating of the seal 33 of the valve part 31 are compared in magnitude.

The pressure receiving part 32 of the valve part 31 and the movable membrane 41 in the valve mechanism 30 are not affected by the opened or closed state of the air-operated valve 10 and receive equal fluid pressure of the controlled fluid. In view of this point, in the illustration, the diametrical distance MD is used as the standard, and the diametrical distance SD is made larger than the diametrical distance MD (SD>MD). This being so, the fluid pressure of the controlled fluid which is applied to the pressure receiving part 32 of the valve part 31 is also applied, so the downward force acting in the advancing direction of the valve mechanism 30 (arrow X-direction) from the controlled fluid to the pressure receiving part 32 of the valve part 31 becomes larger than the upward force acting in the retracting direction (arrow Y-direction) of the valve mechanism 30 from the controlled fluid to the movable membrane 41 of the diaphragm 40.

As a result, the downward (arrow X-direction) force at the valve mechanism becomes stronger, so even when using a first spring with a smaller spring force, it becomes possible to sufficiently make the seat sit on the valve element. It is possible to make the spring force of the first spring smaller, so the impact between the valve element and seat at the time of seating also becomes smaller.

Further, when using the diametrical distance MD as a standard and making the diametrical distance SD equal to the diametrical distance MD (SD=MD (including SD≈MD)) (not shown), the Above-mentioned downward force acting in the advancing direction of the valve mechanism 30 (arrow X-direction) from the controlled fluid to the pressure receiving part 32 of the valve part 31 and the upward force acting in the retracting direction (arrow Y-direction) of the valve mechanism 30 from the controlled fluid to the movable membrane 41 of the diaphragm 40 become substantially equal and balanced. By the balance of the upward and downward direction forces at the valve mechanism in this way, even if using the first spring with the smaller spring force, it becomes possible to sufficiently make the valve element sit on the seat. In the same way as the case where SD=MD (including SD≈MD), as a result, it is possible to reduce the spring force of the first spring, so the impact between the valve element and the seat at that time of seating also becomes smaller.

Figure 7:
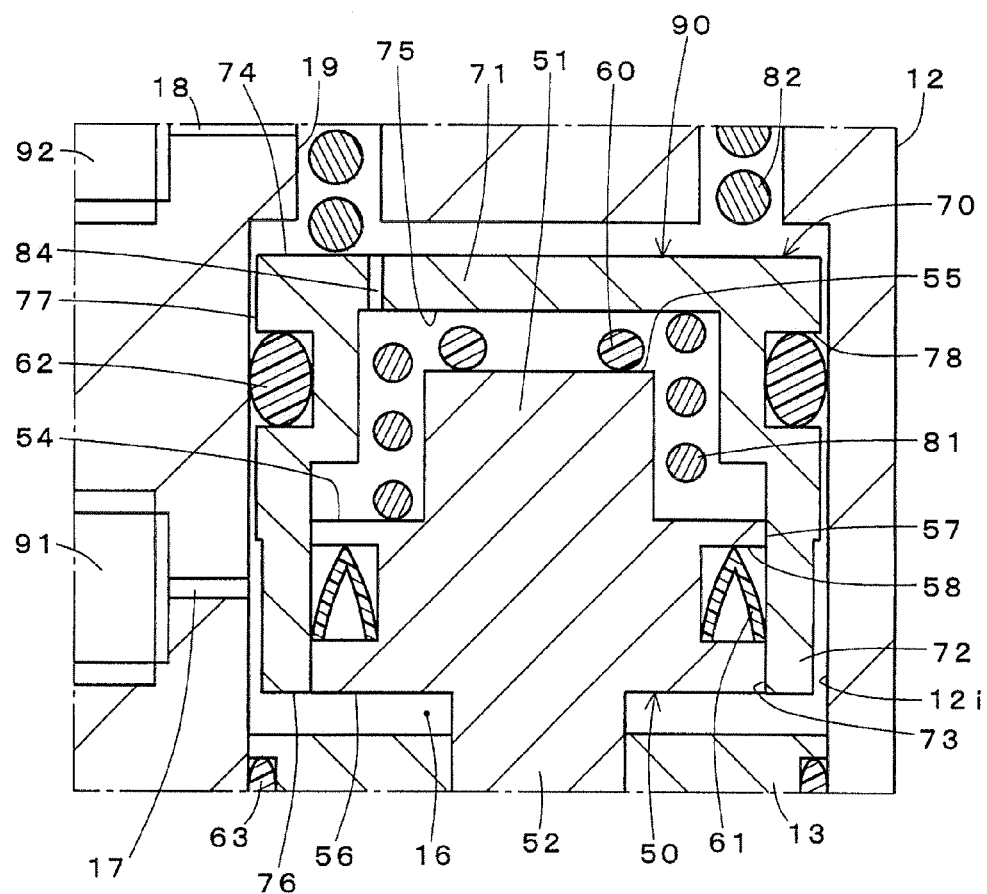
FIG. 7 is a partial cross-sectional view of an example of a different location of arrangement of a buffer member.

The enlarged cross-sectional view of FIG. 7 is an example of a changed arrangement of the buffer member 60. The buffer member 60 is a member for easing the impact upon contact of the first piston 50 and the second piston 70, so is not particularly limited so long as at a location where pistons contact each other. As shown in FIG. 7, the buffer member 60 is interposed between the piston abutting part 55 which abuts against the top of the first piston head 51 in the first piston 50 and the piston abutting part 75 which abuts against the bottom of the second piston head 71 in the second piston 70. Of course, the interposition position and number of the buffer member 60 may be suitably selected by the shape, size, etc. of the piston assembled in the air-operated valve.

Figure 8:
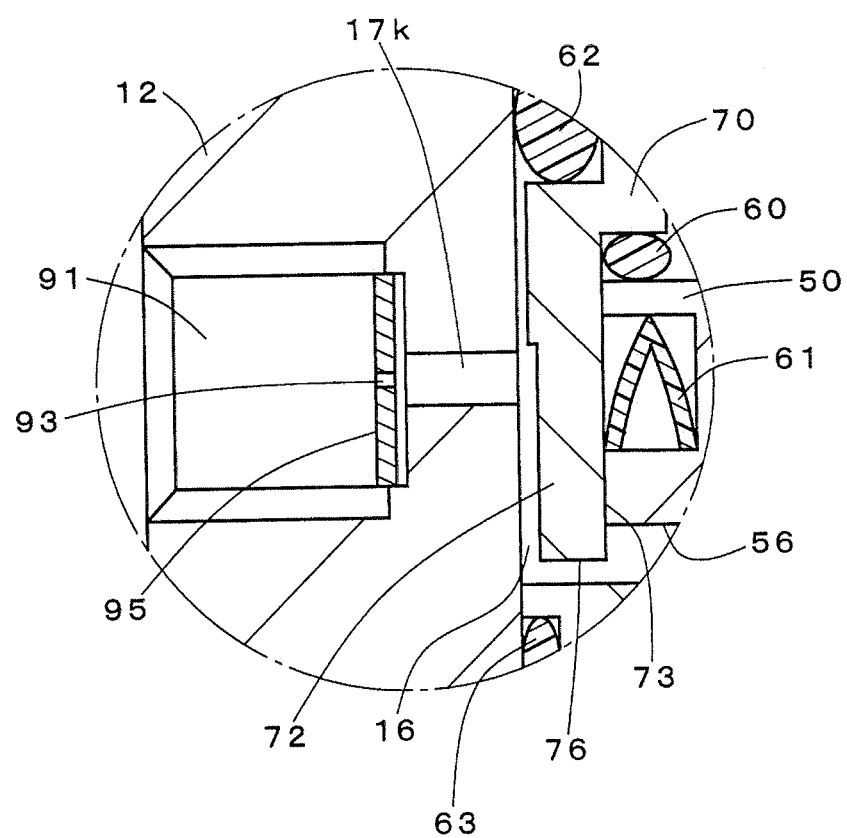
FIG. 8 is an enlarged cross-sectional view of a venturi of working air.

The enlarged cross-sectional view of FIG. 8 shows another mode of the venturi of the working air. As illustrated, inside the first air port 91, a plate member 95 having a fine hole 93 is inserted. By using the plate member 95, it is possible to reduce the size of the passage through which the working air circulates compared with a small sized passage 17k. For this reason, it becomes possible to suppress the amount of inflow and amount of outflow of the working air.

From here, the operation of the drive mechanism 90 in the air-operated valve 10 of the present invention will be explained using FIG. 1 to FIG. 4 and FIG. 5. Note that the effect of the frictional resistance occurring between the packings and members at the different locations is troublesome to explain, so explanations will be omitted.

In FIG. 1, working air flows in from the first air port 91 to the piston space 16 of the housing body 12 whereby the feed pressure of the working air in the piston space 16 is maintained. The working air is given a feed pressure countering the biasing forces of the first spring 81 and second spring 82. By the first piston pressure receiving part 56 of the first piston 50 and the second piston pressure receiving part 76 of the second piston 70 receiving the feed pressure of the fed working air, both the first piston 50 and second piston 70 are lifted up.

In the case of FIG. 1, both the first piston 50 and second piston 70 of the drive mechanism 90 rise to the retracted position, then the valve part 31 of the valve mechanism 30 which is connected to the first piston 50 also rises linked with the position of the first piston 50 whereby the valve part 31 enters the retracted position. Therefore, the seal 33 of the valve part 31 separates from the seat 23, so the seal of the seat 23 is released and circulation of the controlled fluid in the valve chamber 20 is secured.

Figure 2:
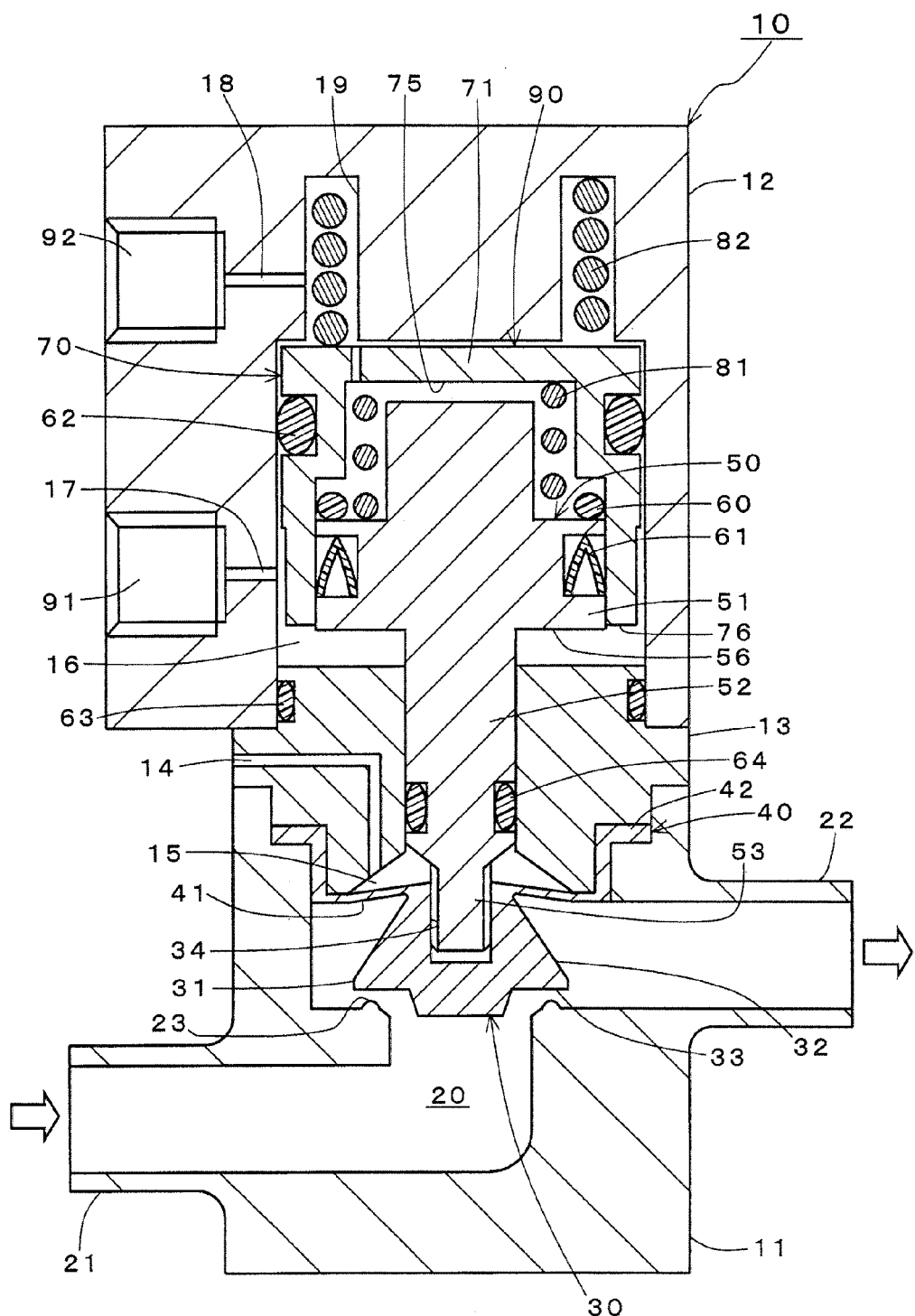
FIG. 2 is a second longitudinal cross-sectional view of that air-operated valve.

In FIG. 2, the feed pressure of the working air which is fed from the first air port 91 to the piston space 16 has fallen below the above-mentioned FIG. 1. In particular, in the air-operated valve 10 of the present invention, the spring force of the second spring 82 which biases the second piston 70 is set larger than the spring force of the first spring 81 biasing the first piston 50. Therefore, by the feed pressure of the working air dropping, the spring force of the first spring 81 counters the rising force of the working air occurring at the first piston pressure receiving part 56 of the first piston 50. The spring force of the first spring 81 overcomes the rising force of the working air whereupon first the first piston 50 starts to descend in advance of the second piston 70.

The spring force of the first spring 81 is set to a load which is larger than the product of "the fluid pressure of the controlled fluid which circulates through the inside of the valve chamber 20" and "the effective pressure receiving area at the valve mechanism 30". When the controlled fluid is circulating, even in the state where the fluid pressure is applied to the valve element or movable membrane, the valve mechanism 30 can be made to descend.

Figure 3:
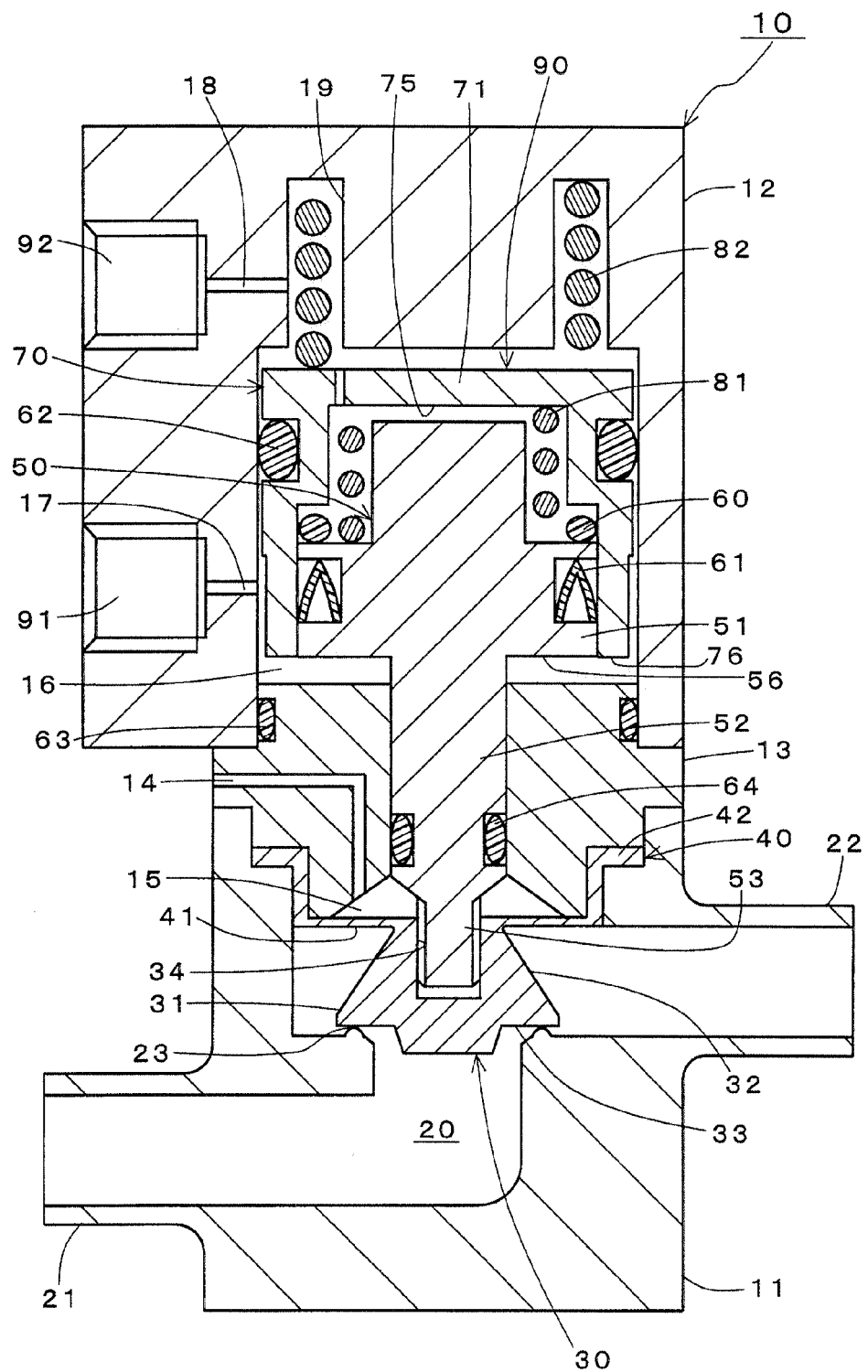
FIG. 3 is a third longitudinal cross-sectional view of that air-operated valve.

In FIG. 3, the feed pressure of the working air which is fed from the first air port 91 to the piston space 16 falls further from FIG. 2. In the same way as the explanation of FIG. 2, the feed pressure of the working air further falls, the spring force of the first spring 81 overcomes the rising force of the working air which occurs at the first piston pressure receiving part 56, the first piston 50 descends in advance of the second piston 70, next, the spring force of the second spring 82 overcomes the rising force of the working air which occurs at the second piston pressure receiving part 76. Further, the second piston 70 starts to descend delayed from the first piston 50. Further, the seal 33 of the valve part 31 of the valve mechanism 30 sits on the seat 23.

Figure 4:
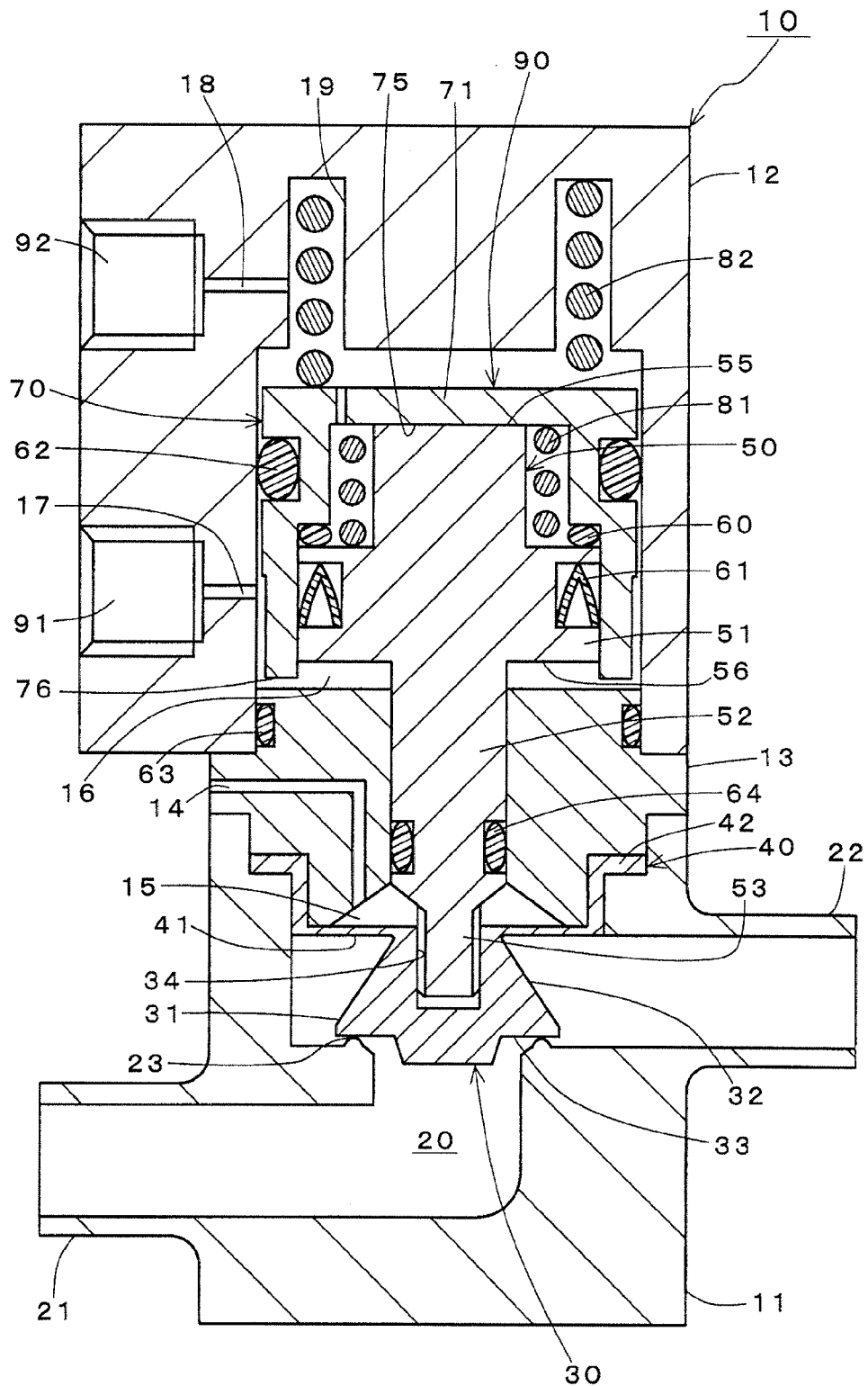
FIG. 4 is a fourth longitudinal cross-sectional view of that air-operated valve.

In FIG. 4, the feed pressure of the working air which is fed from the first air port 91 to the piston space 16 falls further from FIG. 3. Due to the spring force of the second spring 82, the second piston 70 continues to descend whereby the piston abutting part 75 of the second piston 70 contacts the piston abutting part 55 of the first piston 50. Furthermore, along with the biasing force of the second spring 82, the second piston 70 descends whereby the second piston 70 biases the first piston 50 in the direction of the seat 23 (downward).

In FIGS. 3 and 4, the second piston 70 starts to descend delayed from the first piston 50, then the seal 33 of the valve part 31 of the valve mechanism 30 sits on the seat 23, and both of the first piston 50 and second piston 70 bias the valve part 31 to the seat 23 side. Of course, the invention is not limited to this order. Sometimes, the first piston 50 descends so that the seal 33 of the valve part 31 of the valve mechanism 30 sits on the seat 23, then the second piston 70 descends delayed from the first piston 50, and finally, both the first piston 50 and the second piston 70 bias the valve part 31 to the seat 23 side.

The seal force when the valve part 31 (seal 33) sits on the seat 23 along with the descent of the first piston 50 is mainly the biasing force of the first spring 81 (see FIG. 3). The spring force of the second spring 82 is set larger than the first spring 81, so when the descent of the second piston 70 causes a downward increase of the force which the first piston 50 receives, the valve part 31 receives not only the biasing force of the first spring 81, but also the biasing force of the second spring 82. That is, the valve part 31 receives a stronger force in the descent direction, so in the seated state of the valve part 31, the seal strength between the valve part 31 and the seat 23 is raised more. The seal force which is required between the valve part 31 and the seat 23 becomes the load which is required for stopping the controlled fluid and continuing to press the seal 33 of the valve part 31 against the seat 23. Therefore, this seal force corresponds to the total load of the spring force of the first spring 81 and the spring force of the second spring 82.

For example, in the case of the conventional air-operated valve shown in FIG. 9, to move the valve part to the seated state and continue to maintain sufficient sealability of the seat, it is necessary to select a spring with a spring force larger than the force which the controlled fluid applies to the valve mechanism. For this reason, impact at the time the valve part sits on the seat at the time the piston descends along with the control of the feed of working air becomes unavoidable.

In the structure which is disclosed in this embodiment of the present invention, the first spring 81 which biases the first piston 50 has a spring force made an extent required for moving the valve part to the seated state and made higher than the fluid pressure of the controlled fluid. In this case, the spring force of the first spring 81 which biases the first piston 50 becomes a load which can react to a drop in the feed pressure of the working air, so does not have to be an especially powerful spring force. The valve element 31 sits on the seat 23 once due to the weak biasing force from the first spring 81. For this reason, contamination of the controlled fluid by particles which are generated due to shedding of the material as a result of the impact at the time of seating upon valve closure is suppressed. Next, the descending pressure of the second piston 70 which descends delayed from the first piston 50 (biasing force of second spring 82) is also added. At this point of time, the biasing forces of the two pistons are added, and a seal force resulting from the valve part 31 pushing against the seat 23 is obtained. From this, the circulation of the controlled fluid is effectively stopped.

That is, by providing two pistons and springs used for biasing the same, it is possible to separate the biasing force into the biasing force of the spring required for seating of the valve part and the biasing force of the spring required for raising the seal performance of the seat. Even if a biasing force (load) raising the seal force is applied after the valve part is seated on the seat, it is already seated, so there is no impact between the two and no particles are generated. Accordingly, it is possible to greatly contribute to the reduction of the generation of particles upon shedding of material due to the impact at the time of seating of the air-operated valve.

The inventors prepared a prototype of the air-operated valve and verified that the configuration of the present invention illustrated and explained in detail above was effective. In the prototype, the area of the first piston pressure receiving part of the first piston was 1.64 cm$^2$, the area of the second piston pressure receiving part of the second piston was 1.13 cm$^2$, the pressure receiving area of the valve mechanism was 0.56 cm$^2$, the diametrical distance SD of the seat sealed by the valve part sitting on it was 8.8 mm, and the diametrical distance MD at the position of the movable membrane of the diaphragm dividing the movable membrane maximum diameter and the movable membrane minimum diameter in two was 8.5 mm. The first spring which biased the first piston was made one with a 44N spring force, while the second spring which biased the second piston was made one with a 59N spring force. The first piston and the second piston were formed by machining from a fluororesin. Because of observing, the valve chamber body, housing body, and intermediate body were formed from an acrylic resin. The members were assembled as in the illustrated embodiment.

When operating the prototype air-operated valve, the fluid pressure of the controlled fluid which was circulated was made 500 kPa, the feed pressure of the working air in the open state was made 550 kPa, and the final feed pressure of the working air in the closed state was made 0 kPa. The controlled fluid was made water, while the working air was made plain air.

The prototype air-operated valve was fed with working air at a feed pressure of 550 kPa to push up the first piston and second piston (drive mechanism) to the retracted position, separate the valve part of the valve mechanism from the seat, and circulate the controlled fluid to this air-operated valve. Next, the feed of the working air was stopped and the feed pressure was reduced from 500 kPa to 0 kPa. This state was observed visually (video), whereupon it was confirmed that the second piston descended delayed from the descent of the first piston, the valve part was seated on the seat, and the second piston pushed the first piston.

Therefore, it was possible to realize the two points of seating of the valve part on the seat and improvement of the seal performance by the valve part. Of course, so long as provided with the configuration defined in the present invention, dimensions other than those prepared in the above embodiment as a prototype also become possible of course. For example, it is possible to select a spring commensurate with the difference of load considering the fluid pressure of the controlled fluid, the pressure receiving area of the piston, the working air pressure, etc.

Explaining the reference numerals, in the drawings, 10 indicates the air-operated valve, 11 the valve chamber body, 12 the housing body, 13 the intermediate body, 16 the piston space, 17 the small sized passage (venturi), 20 the valve chamber, 21 the inflow part, 22 the outflow part, 23 the seat, 30 the valve mechanism, 31 the valve part, 32 the pressure receiving part, 33 the seal, 40 the diaphragm, 41 the movable membrane, 50 the first piston, 51 the first piston head, 56 the first piston pressure receiving part, 60 the buffer member, 70 the second piston, 71 the second piston head, 76 the second piston pressure receiving part, 81 the first spring, 82 the second spring, 90 the drive mechanism, 91 the first air port, 92 the second air port, SD the diametrical distance of seal sealed by seal of valve part sitting on seat, and MD the diametrical distance of movable membrane of diaphragm at position of movable membrane maximum diameter and movable membrane minimum diameter divided into two.

The invention claimed is:
1. An air-operated valve which is provided with
   a valve chamber body which has a valve chamber which forms an inflow part of a controlled fluid, an outflow part of said controlled fluid, and a seat between said inflow part and said outflow part,
   a valve mechanism which is provided with a valve part which has a seal which advances to and retracts from said seat to seal the same and with a diaphragm which is formed at an opposite side from said seal side and which is attached inside said valve chamber, and a housing body which houses a drive mechanism which uses working air which flows in and out from an air port so as to make said valve mechanism advance and retract to thereby drive and control an opening and closing operation of said seat, said drive mechanism provided with a first piston which is connected to said valve mechanism and which has a first pressure receiving part which receives said working air which flows in from said air port, a first spring which biases said first piston to said seat side, a second piston which is slidably housed in said housing body, which slidably houses said first piston inside of it, and which has a second pressure receiving part which receives said working air which flows in from said air port, and a second spring which biases said second piston to said first piston side, said second spring has a spring force larger than a spring force of said first spring, when the working air from said air port falls in feed pressure, the load of said first spring counters a rising force of working air which occurs in said first pressure receiving part whereby said first piston descends before said second piston, and, after that, said second piston descends delayed from said first piston whereby said second piston biases said first piston in the seat direction to thereby increase a seal strength between said valve part and said seat in said seated state.

2. An air-operated valve as described in claim 1 wherein said first piston and said second piston have a buffer member interposed between them.

3. An air-operated valve as described in claim 1 wherein said seal of said valve part which sits on said seat is flat in shape.

4. An air-operated valve as described in claim 1 wherein said valve part has a pressure receiving part which receives a fluid pressure of the controlled fluid in an advancing direction of said valve mechanism.

5. An air-operated valve as described in claim 1 wherein a diametrical distance (SD) of said seat which said seal of said valve part sits on the seal is formed to be larger than or the same in size as a diametrical distance (MD) of said diaphragm dividing a movable membrane maximum diameter and a movable membrane minimum diameter in two.

6. An air-operated valve as described in claim 1 wherein a piston space between said air port and said housing body is provided with a venturi of the working air.

* * * * *